United States Patent [19]

Schefts

[11] Patent Number: 5,142,653
[45] Date of Patent: Aug. 25, 1992

[54] METHOD AND CIRCUIT ARRANGEMENT FOR DETERMINING THE QUALITY OF VIRTUAL CONNECTIONS THROUGH AN ASYNCHRONOUS TRANSFER MODE SWITCHING EQUIPMENT

[75] Inventor: Horst Schefts, Munich, Fed. Rep. of Germany

[73] Assignee: Siemens Aktiengesellschaft, Munich, Fed. Rep. of Germany

[21] Appl. No.: 741,731

[22] Filed: Aug. 7, 1991

[30] Foreign Application Priority Data

Aug. 8, 1990 [EP] European Pat. Off. ........ 90115250.4

[51] Int. Cl.⁵ .................. G06F 11/04; H04B 3/46; H04M 3/24
[52] U.S. Cl. .................... 379/16; 371/20.1; 375/10
[58] Field of Search ............ 379/15, 16; 371/2.1, 371/4, 5.1, 20.1; 375/10

[56] References Cited

U.S. PATENT DOCUMENTS

| | | | |
|---|---|---|---|
| 4,542,507 | 9/1985 | Read | 371/20.1 X |
| 4,736,402 | 4/1988 | Landis | 379/16 |
| 5,081,666 | 1/1992 | Blaschek et al. | 375/10 X |

FOREIGN PATENT DOCUMENTS

0310173A1 4/1989 European Pat. Off. .

OTHER PUBLICATIONS

Koinuma, et al, "An ATM Switching System Based on a Distributed Control Architecture", XII International Switching Symposium, Session A7, May 1990 pp. 21-26.

*Primary Examiner*—Stafford D. Schreyer
*Attorney, Agent, or Firm*—Hill, Van Santen, Steadman & Simpson

[57] ABSTRACT

For determining the quality of virtual connections between input lines and output lines of an ATM switching equipment, the plurality of accepted and output message cells is separately acquired in a call-associated manner in the ATM switching equipment on the basis of cell headers of the message cells accepted via the input lines and, respectively, output to the output lines. In response to the cleardown of a respective virtual connection, the loss rate of the message cells is then calculated as a measure for the quality of the respective virtual connection from the previously, separately-acquired plurality of accepted and output message cells.

11 Claims, 1 Drawing Sheet

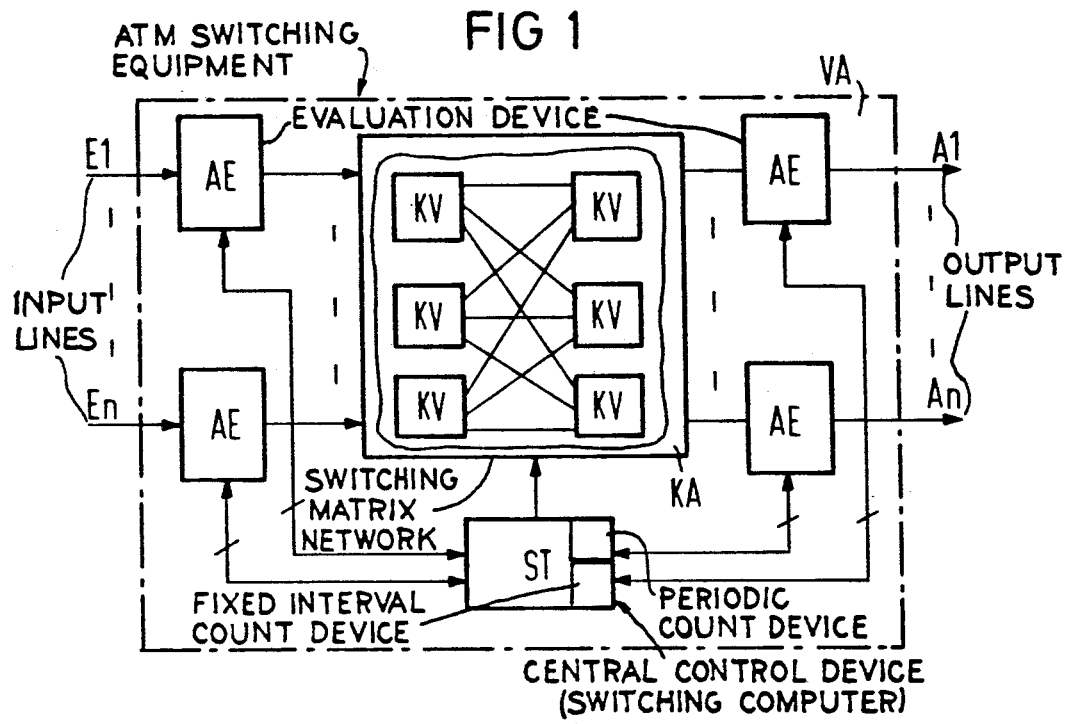
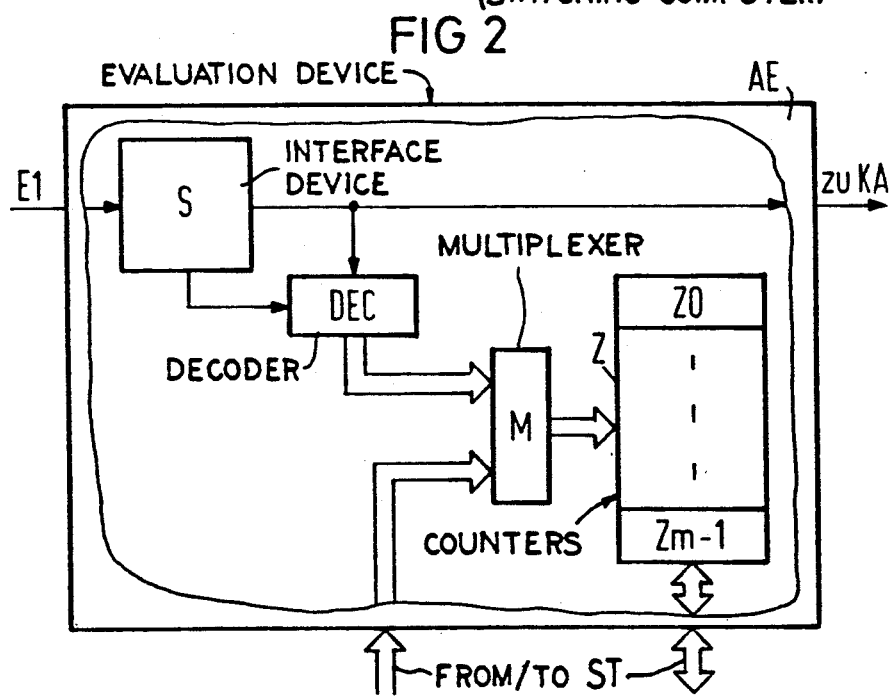

METHOD AND CIRCUIT ARRANGEMENT FOR DETERMINING THE QUALITY OF VIRTUAL CONNECTIONS THROUGH AN ASYNCHRONOUS TRANSFER MODE SWITCHING EQUIPMENT

BACKGROUND OF THE INVENTION

1. Field of the Invention

The present invention relates to a method and to a circuit arrangement for determining the quality of virtual connections extending via input lines and output lines of an asynchronous transfer mode (ATM) switching equipment, whereby respective message cells are transmitted according to an asynchronous transfer mode process during the course of these virtual connections and each of these message cells thereby has a cell header available for identifying the respective virtual connection for the input line or, respectively, output line coming into consideration.

2. Description of the Prior Art

The problem generally arises in telecommunication switching systems of monitoring the quality of defined connections in order to be able to provide subscribers with appropriate information, for example, given complaints. The operators of public or private switching equipment, however, also have the need for or, respectively, raise the requirement of being able to measure and monitor the quality of the switching equipment. Quality measurements of this type also enter into the maintenance concepts in order to be able to, for example, avoid predictable deteriorations in quality beyond an allowable tolerance limit.

Given a method and a circuit arrangement of the type initially set forth, it is therefore an object of the present invention to provide a way to determine the quality of virtual connections on the basis of the message cells transmitted during the course of such virtual connections.

In a method of the type set forth above, this object is achieved, according to the present invention, in an improved method for determining the quality of virtual connections extending via input lines and output lines of an ATM switching equipment in which respective message cells are transmitted according to an asynchronous transfer mode during the course of these virtual connections and each of the message cells thereby has a cell header available with which the respective virtual connection for the input line or, respectively, output line coming into consideration is identified, and is particularly characterized in that the plurality of message cells accepted and output are separately acquired in a call-associated manner in the ATM switching equipment on the basis of the cell headers of the message cells accepted via the input lines or, respectively, output to the output lines, and in that, in response to the cleardown of the respective virtual connection, the loss rate of the message cells is calculated as a measure for the quality of the respective virtual connection, being determined from the previously, separately-acquired plurality of accepted and output message cells.

The present invention yields the advantage that the quality of the individual virtual connections can be continuously determined on the basis of the transmitted message cells without significantly dynamically loading an ATM switching equipment for this determination.

According to a particular feature of the invention, the aforementioned improved method is further particularly characterized in that a mean loss rate is formed as quality measure for the ATM switching equipment on the formation being from the identified loss rates of the virtual connections established within a defined time interval. Also, the improved method is particularly characterized in that the loss rate identified for the respective virtual connection is involved in the calculation of charges. This feature and development yields the advantage of a simple determination of the quality of an ATM switching equipment.

The advantage of the improved circuit arrangement set forth above is that only the message quantity forwarded by an ATM switching equipment to a subscriber equipment, in fact, enters into the calculation of charges. Message cells repeatedly transmitted within an ATM switching equipment or, respectively, misrouted message cells due, for example, to transmission malfunctions are left out of consideration for calculating charges.

The circuit arrangement for the implementation of the method set forth above is characterized in that a plurality of counters corresponding in number to the plurality of virtual connections extending via the input lines and the output lines is assigned to the input lines and to the output lines, in that the plurality of counters can be placed into a defined initial counter reading proceeding from a central control device during the respective course of the setup of the allocated virtual connection, in that the individual counters are individually drivable given the appearance of message cells on the allocated input line or, respectively, output line, being individually drivable according to the prescription of the cell header respectively contained in the message cells, and in that the momentary counter reading of a counter is variable by a counting unit proceeding from a defined initial counter reading, the reading being variable with each drive, and in that the momentary counter readings of the counter assigned to a virtual connection can be interrogated at least at the cleardown of the connection by a central control device for calculating the loss rate.

The advantage of the circuit arrangement is thereby that the registration of the message cells transmitted during the course of virtual connections occurs in peripheral equipment so that the central control device of an ATM switching equipment is largely relieved of the determination of the quality of the virtual connections.

According to other features and developments of the invention, the circuit arrangement is particularly characterized in that the momentary counter readings of the counter can be additionally interrogated at fixed time intervals. Also, the arrangement is particularly characterized in that the counters are fashioned as periodically-circulating counters and in that a message signal is separately offered to the central control device before a cleardown of the respective virtual connection each time a defined counter reading is reached. The advantage of these features and developments is that the counters provided for the registration of message cells require only a relatively low counting capacity and, therefore, the required circuit expense can be kept low.

BRIEF DESCRIPTION OF THE DRAWING

Other objects, features and advantages of the invention, its organization, construction and operation will be best understood from the following detailed description, taken in conjunction with the accompanying drawings, on which:

FIG. 1 is a schematic block circuit diagram of an ATM switching equipment employing the present invention; and FIG. 2 is a block circuit diagram of a possible structure of an evaluation device which is schematically illustrating one of a plurality of portions of FIG. 1.

DESCRIPTION OF THE PREFERRED EMBODIMENTS

FIG. 1 schematically illustrates an ATM switching equipment VA to which a plurality of input lines E1–En is connected, as well as a plurality of output lines A1–An. Only the input lines E1 and En and the output line A1 and An are shown in FIG. 1. A respective transmission of message cells occurs on the input lines and the output lines during the course of virtual connections based on an asynchronous transfer mode. It is assumed that the message cells may be cells having a fixed length that respectively have a cell header as well as an information part available. The transmission of the actual message signals occurs in the information part. What are thereby to be understood by message cells are data and text signals as well as voice signals or, respectively, image signals in digital form. Among other things, by contrast, a cell header contains what are referred to as a virtual channel number with which the respective virtual connection on the output line or, respectively, output line coming into consideration is identified. In transmission pauses, moreover, dummy cells corresponding to the message cells are transmitted.

As proceeds from FIG. 1, each of the input lines and output lines has an evaluation device AE assigned thereto, whereby all evaluation devices are in communication with the central control device ST in the form of a switching computer. An evaluation device AE connected to an input line accepts the message cells transmitted during the course of virtual connections and, when they are forwarded to a switching matrix network KA of the ATM switching equipment, calculates the plurality of message cells transmitted during the course of the respective virtual connection in a call-associated manner. In a corresponding manner, an evaluation device AE connected to an output line accepts the message cells supplied thereto during the course of virtual connections and, when these are forwarded to a subscriber equipment or, respectively, to a following ATM switching equipment, calculates the plurality of message cells transmitted during the course of the respective virtual connection in a call-associated manner. The plurality of message cells accepted into the ATM switching equipment and of the message cells forwarded therefrom are therefore separately acquired by the evaluation devices AE for each virtual connection proceeding between an input line and an output line of the ATM switching equipment. After the cleardown of the respective virtual connection, the loss rate is calculated as a measure for the quality of the respective virtual connection, being calculated by the central control device ST by forming the difference between the plurality of accepted and output message cells.

Only by way of an example, a multi-stage structure having a plurality of switching matrices KV interconnected to one another is set forth in FIG. 1 for the switching matrix network KA that can be controlled proceeding from the central control device ST. However, arbitrary single-stage or multi-stage switching matrix networks can also be employed. Since the structure and the functioning of such switching matrix networks for the forwarding of message cells to output lines referenced A1–An in FIG. 1 is known in the art, the same shall not be discussed in greater detail below.

A possible structure of the evaluation device AE shown in FIG. 1 is illustrated in FIG. 2 with reference to the evaluation device AE connected to the input line E1. Only those circuit portions that are necessary for an understanding of the present invention are therefore set forth in FIG. 2.

An interface device S is connected to the input line E1, the interface device S constantly monitoring the occurrence, with the assistance of a comparator, of message cells to be transmitted to the switching matrix network KA. The recognition of a cell header thereby leads to the output of a control signal that is supplied to the central control device ST, as well as to a decoder DEC, as an enable signal. Moreover, the respective cell header is fed to the decoder DEC. By decoding the virtual channel number contained in such a cell header, the decoder DEC thereby offers address signals that are supplied via first inputs of a multiplexer M to a counter arrangement Z. The counter arrangement Z comprises a separate counter for each of the virtual connections possible on the appertaining input line E1. The individual counters can thereby be individually driven according to the prescription of the virtual channel numbers contained in the message cells and decoded by the aforementioned decoder DEC. When, for example, m virtual connections referenced "0" through "m-1" can proceed via the appertaining input line, then counters referenced Z0–Zm-1" are assigned to these, as indicated in FIG. 2.

Via second inputs of the multiplexer M, address signals can be additionally supplied to the counter arrangement Z proceeding to the central control device ST shown in FIG. 1 in order to be able to individually drive the individual counters. In addition, the central control device is in communication with the counter arrangement Z via bidirectional data lines.

The structure of the evaluation device illustrated in FIG. 2 having been set forth, the functioning thereof shall now be discussed in greater detail.

During the set up of virtual connections, the counters of the input lines and the output lines coming into consideration and assigned to these virtual connections are individually driven by offering corresponding address signals proceeding from the control device ST. With signals transmitted via the data lines, the central control device thereby places the respective counter into a defined initial counter reading that, for example, can assume to be defined as "0".

When message cells then appear on the input line E1 after the set up of virtual connections, the cell headers pertaining to these message cells are decoded by the decoder DEC. The counters "Z0–Zm-1" assigned to the virtual connections are individually driven with the address signals resulting therefrom. Given such a drive, the momentary counter reading is thereby modified by one counting unit, for example by the binary value "1". The current, momentary counter reading resulting therefrom then remains stored until the renewed drive of the respective counter. The individual drive of the individual counters repeats with every occurrence of a message cell to be acquired by the respective counter until the respective virtual connection is cleared down.

The control events just set forth with reference to the example of the evaluation device AE connected to the input line E1 also sequence correspondingly in the other evaluation devices illustrated in FIG. 1. Two counters are therefore controlled for each virtual connection extending between an input line and an output line. The counter connected to the input line coming into consideration thereby acquires the message cells accepted into the ATM switching equipment during the course of the appertaining virtual connection. By contrast thereto, the counter connected to the output line coming into consideration executes an acquisition of the message cells forwarded from the ATM switching equipment during the course of the appertaining virtual connection.

Upon cleardown of a virtual connection, the counters assigned to this connection are driven from the central control device ST by offering corresponding address signals. The momentary counter readings stored at this time in the two counters are thereby interrogated. As already mentioned above, the loss rate, for example, is calculated as a measure for the quality of the appertaining virtual connection on the basis of these momentary counter readings by forming a difference therebetween. As mentioned at the beginning, the loss rates of the individual virtual connections can then be utilized for maintenance purposes, for information with respect to the quality of the individual virtual connections and for calculating charges.

In addition, an average loss rate, as a measure for the quality of the overall ATM switching equipment, can be formed by averaging the loss rates of the individual virtual connections established within a determined time interval.

It should also be pointed out with respect to the aforementioned control events that two separate processing intervals are defined with each appearance of a message cell or, respectively, dummy cell. In a first processing interval, the drive of the counter coming into consideration occurs at the appearance of a message cell. The second processing interval, by contrast, is available to the central control device ST for a setting of a counter given a call set up or, respectively, for a transfer of a momentary counter reading given a call clear down. Moreover, the individual counters can be designed for a relatively low counting capacity when the momentary counter readings of these counters are interrogated at defined time intervals proceeding from the central control device. For example, these time intervals could lie in the range of minutes. In addition, the counters can also be fashioned as periodically circulating counters that deliver a message signal (overflow signal) to the central control device each time a defined counter reading is reached. The plurality of message signals output during the course of time for the individual counters can then be added up in a counter-associated manner in the central control device and can be taken into consideration in the evaluation of the momentary counter readings upon cleardown of the virtual connections.

In conclusion, it should also be pointed out that the above-explained invention can be utilized not only in the narrower sense in ATM switching systems, but can also be generally utilized in equipment of an ATM network, for example in concentrators, being used for determining the quality of virtual connections.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method of the type in which message cells are transmitted in accordance with an asynchronous transfer mode via virtual connections of an asynchronous transfer mode switching equipment and via input and output lines of the asynchronous transfer mode switching equipment, in which the virtual connections or the corresponding input and output lines are identified by message cell headers which are individually attached to each message cell, the improvement therein of determining the quality of the virtual connections, comprising the steps of:
   (a) counting the number of message cells accepted via each input line separately for each of said virtual connections;
   (b) counting the number of message cells output to each output line separately for each of said virtual connections; and
   (c) calculating the loss rate of message cells for the previously, separately-acquired accepted and output message cells as a measure of quality of a respective virtual connection.

2. The improved method of claim 1, wherein the steps (a) and (b) of counting accepted and output message cells and the step (c) of calculating are further defined as:
   (a1) counting the message cell headers of accepted message cells;
   (b1) counting the message cell headers of output message cells; and
   (c1) forming the difference between the counts of the steps (a1) and (b1).

3. The improved method of claim 1, wherein the step (c) of calculating is further defined by the step of:
   (c1) calculating the loss rates of virtual connections established within a defined time interval.

4. The improved method of claim 1, and further comprising the step of: (d) applying the loss rate for a virtual connection in calculating charges therefor.

5. In an asynchronous transfer mode communication system of the type in which message cells, each including a message cell header, are received on a plurality of input lines and output on a plurality of output lines of an asynchronous transfer mode switching equipment, in which virtual connections are identified and established through the switching equipment, including respective input and output lines, by the message cell headers, the improvement therein of a circuit arrangement for determining the quality of the virtual connection, comprising:
   a plurality of counters corresponding in number to the number of virtual connections extending between the plurality of input lines and the plurality of output lines;
   a central control device connected to said plurality of counters and operable to set each counter of said plurality of counters to a defined initial count during the set up of a virtual connection;
   drive means connected to said input lines and to said output lines and operable to individually drive said counters in response to receipt of a message cell header identifying the respective virtual connection such that the count of each of said counters is varied proceeding from the respective initial count in response to each drive; and interrogation means in said central control device for interrogating the counts of each of said counters in response to cleardown of the respective virtual connection by said central control device for calculating the loss rate.

6. The improved asynchronous transfer mode communication system of claim 5, wherein said interrogation means of said central control device comprises: fixed interval interrogation means for interrogating the counts of said counters at fixed time intervals.

7. The improved asynchronous transfer mode communication system of claim 5, wherein:

each of said counters is a circulating counter operable to produce a message signal for said central control device upon reaching a predetermined count before cleardown of the respective virtual connection.

8. Asynchronous mode transfer equipment comprising:

a plurality of input lines for receiving message cells according to an asynchronous transfer mode transmission, each of said message cells including a cell header attached thereto which defines a respective virtual connection through said asynchronous mode transfer equipment by way of a virtual channel number;

a plurality of output lines for forwarding message cells according to the asynchronous transfer mode;

a switching matrix network for switching through the message cells via the virtual connections and including a plurality of inputs and a plurality of outputs, said inputs equal in number to said plurality of input lines and said outputs equal in number to said plurality of output lines;

a plurality of first evaluation devices, each of said first evaluation devices connected between a respective input line and a respective input of said asynchronous transfer mode switching matrix network;

a plurality of second evaluation devices each connected between a respective asynchronous transfer mode switching matrix network output and a respective output line;

each of said first and second evaluation devices operable to determine the number of message cells received via the respective input line and the respective output of said asynchronous transfer mode switching equipment in response to a cleardown signal for the respective virtual connection; and a central control device connected to said plurality of first evaluation devices and to said plurality of second evaluation devices and operable to supply thereto the respective cleardown signal and interrogate the respective evaluation devices and evaluate the message cell loss rate as a measure of the quality of the respective virtual connections.

9. The asynchronous transfer mode equipment of claim 8, wherein each of said evaluation devices comprises:

an interface connected to a respective input line and input of said switching matrix network or switching matrix network output and respective output line for constantly monitoring the receipt of message cells and produce a respective enable signal;

a decoder connected to said interface for decoding each message cell header to obtain a respective virtual channel number and provide a corresponding address signal;

a multiplexer connected to said decoder for receiving the address signals and to said central control device for receiving control signals;

a plurality of counters, each for a respective virtual connection, said plurality of counters connected to said multiplexer and driven thereby in accordance with the addressed virtual channel numbers to count each occurrence of a message cell received by the respective interface; and said central control device connected to said plurality of counters for reading the counts thereof and determining the loss rate of the counters assigned to each respective virtual connection as a measure of the quality of the virtual connection.

10. The asynchronous transfer mode equipment of claim 9, wherein said central control device comprises: means operable at fixed intervals to interrogate said plurality of counters.

11. The asynchronous transfer mode equipment of claim 9, wherein said central control device comprises:

means responsive to message signals to determine the loss rate of said virtual connections; and each of said counters is a circulating counter operable to produce a message signal upon reaching a predetermined count before clear down of the respective virtual connection.

* * * * *